US008842763B2

(12) United States Patent
Taoka et al.

(10) Patent No.: US 8,842,763 B2
(45) Date of Patent: Sep. 23, 2014

(54) PRECODING WEIGHT GENERATION METHOD, MOBILE STATION APPARATUS AND BASE STATION APPARATUS

(75) Inventors: Hidekazu Taoka, Tokyo (JP); Katsutoshi Kusume, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/522,737

(22) PCT Filed: Jan. 20, 2011

(86) PCT No.: PCT/JP2011/050947
§ 371 (c)(1),
(2), (4) Date: Aug. 21, 2012

(87) PCT Pub. No.: WO2011/090106
PCT Pub. Date: Jul. 28, 2011

(65) Prior Publication Data
US 2012/0314808 A1    Dec. 13, 2012

(30) Foreign Application Priority Data

Jan. 20, 2010    (JP) ................. 2010-010059

(51) Int. Cl.
*H04B 7/02*    (2006.01)
*H04B 7/06*    (2006.01)
*H04B 7/10*    (2006.01)
*H04B 7/04*    (2006.01)

(52) U.S. Cl.
CPC ............ *H04B 7/0452* (2013.01); *H04B 7/0639* (2013.01); *H04B 7/0689* (2013.01); *H04B 7/10* (2013.01); *H04B 7/0469* (2013.01); *H04B 7/0456* (2013.01); *H04B 7/0634* (2013.01)
USPC ........... 375/267; 375/260; 375/259; 375/295; 455/132; 455/504

(58) Field of Classification Search
USPC ........... 375/267, 260, 259, 295; 455/132, 504
See application file for complete search history.

(56) References Cited

U.S. PATENT DOCUMENTS

2010/0027713 A1    2/2010  Huang et al.
2010/0039928 A1*   2/2010  Noh et al. ............... 370/210
(Continued)

FOREIGN PATENT DOCUMENTS

EP    2 073 471 A1    6/2009
JP    2009 153140 A   7/2009
(Continued)

OTHER PUBLICATIONS

Notification of Reasons for Rejection for Japanese Application No. 2010-010059 dated Feb. 19, 2013, with English translation thereof (4 pages).

(Continued)

*Primary Examiner* — Zewdu Kassa
(74) *Attorney, Agent, or Firm* — Osha Liang LLP

(57) ABSTRACT

To increase a data rate (spectral efficiency) of the entire system also in the case of dynamically switching between SU-MIMO transmission and MU-MIMO transmission, it is a feature that a mobile station apparatus (10) selects a PMI associated with a precoding matrix including matrix elements corresponding to a stream that most approximates a channel matrix indicative of a channel state in a channel transmission path to transmit to a base station apparatus (20) as feedback, and that the base station apparatus (20) extracts the matrix elements corresponding to the stream that most approximates the channel state in the channel transmission path from the precoding matrix associated with the PMI transmitted from the mobile station apparatus (10) as feedback, and based on the extracted matrix elements, generates precoding weights.

7 Claims, 6 Drawing Sheets

(56) References Cited

U.S. PATENT DOCUMENTS

| | | | |
|---|---|---|---|
| 2010/0108278 A1* | 5/2010 | Smith et al. | 162/158 |
| 2011/0135033 A1* | 6/2011 | Ko et al. | 375/295 |
| 2012/0015680 A1* | 1/2012 | Yang et al. | 455/517 |
| 2012/0044894 A1* | 2/2012 | Ko et al. | 370/329 |
| 2012/0108278 A1* | 5/2012 | Kim et al. | 455/501 |

FOREIGN PATENT DOCUMENTS

| | | |
|---|---|---|
| JP | 2009 272942 A | 11/2009 |
| WO | 2008/104907 A2 | 9/2008 |

OTHER PUBLICATIONS

International Search Report from PCT/JP2011/050947 dated Feb. 22, 2011 (2 pages).
Espacenet Abstract Publication No. JP2009272942 A dated Nov. 19, 2009 (1 page).
3GPP TR 25.913 V8.0.0; 3rd Generation Partnership Project; Technical Specification Group Radio Access Network; Requirements for Evolved UTRA (E-UTRA) and Evolved UTRAN (E-UTRAN) (Release 8), Dec. 2008 (18 pages).
Office Action for corresponding Japanese Application No. 2010-010059, mailed Sep. 17, 2013 (4 pages).

* cited by examiner

| PRECODING MATRIX | $PM_1 = \begin{bmatrix} 1 & 1 \\ 1 & -1 \end{bmatrix}$ | | $PM_2 = \begin{bmatrix} 1 & 1 \\ j & -j \end{bmatrix}$ | |
|---|---|---|---|---|
| THROUGHPUT EXPECTATION VALUE | $ST_1=10$ | $ST_2=1$ | $ST_1=8$ | $ST_2=7$ |
| | Sum=11 | | Sum=15 | |

FIG.2

| PRECODING MATRIX | $PM_1 = \begin{bmatrix} 1 & 1 \\ 1 & -1 \end{bmatrix}$ | | $PM_2 = \begin{bmatrix} 1 & 1 \\ j & -j \end{bmatrix}$ | |
|---|---|---|---|---|
| THROUGHPUT EXPECTATION VALUE | $ST_1=10$ | $ST_2=1$ | $ST_1=8$ | $ST_2=7$ |
| | Sum=11 | | Sum=15 | |
| CHORDAL DISTANCE FROM Hk | 0.01 | 3.61 | 1.81 | 1.81 |

FIG. 3

$$PM_3 = \begin{bmatrix} 1 & 1 \\ 1 & -1 \\ 1 & 1 \\ 1 & -1 \end{bmatrix}$$

MATRIX ELEMENTS a (a)

$$PM_3 = \begin{bmatrix} \boxed{\begin{matrix}1\\1\end{matrix}} & \begin{matrix}1\\-1\end{matrix} \\ \boxed{\begin{matrix}1\\1\end{matrix}} & \begin{matrix}1\\-1\end{matrix} \end{bmatrix}$$

$ST_1$, $ST_2$

MATRIX ELEMENTS a (b)

FIG. 7

PRECODING WEIGHT GENERATION METHOD, MOBILE STATION APPARATUS AND BASE STATION APPARATUS

TECHNICAL FIELD

The present invention relates to a precoding weight generation method, mobile station apparatus and base station apparatus, and more particularly, to a precoding weight generation method, mobile station apparatus and base station apparatus that support multi-antenna transmission.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE-scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, it is scheduled to increase 20 MHz that is the maximum system band in LTE specifications to about 100 MHz.

Meanwhile, in LTE-scheme system, MIMO (Multi Input Multi Output) systems are proposed as radio communication techniques for transmitting and receiving data using a plurality of antennas and improving a data rate (spectral efficiency) (for example, see Non-patent Document 1). In the MIMO systems, the transmitter/receiver is provided with a plurality of transmission/reception antennas, and simultaneously transmits different transmission information sequences from different transmission antennas. Meanwhile, the receiver (mobile station apparatus UE) side exploits the fact that different fading variations occur in between transmission and reception antennas, and divides the simultaneously-transmitted information sequences to detect, and it is thereby possible to increase the data rate (spectral efficiency).

In the LTE-scheme system, specified are Single User MIMO (SU-MIMO) transmission in which transmission information sequences simultaneously transmitted from different transmission antennas are all for the same user and Multiple User MIMO (MU-MIMO) transmission in which the transmission information sequences are for different users. In the SU-MIMO transmission and MU-MIMO transmission, the mobile station apparatus UE side selects an optimal PMI (Precoding Matrix Indicator) from a codebook that defines a plurality of phase/amplitude control amounts (precoding matrixes (precoding weights)) to set on antennas of a base station apparatus eNode B and PMIS associated with the precoding matrixes, and transmits the PMI as channel information (CSI: Channel State Information) to the base station apparatus eNode B as feedback. The base station apparatus eNode B side performs precoding on each transmission antenna based on the PMI that is transmitted from the mobile station apparatus UE as feedback, and transmits transmission information sequences.

CITATION LIST

Non-Patent Literature

[Non-Patent Literature 1] 3GPP TR 25.913 "Requirements for Evolved UTRA and Evolved UTRAN"

SUMMARY OF INVENTION

Technical Problems

In the LTE-scheme system, a PMI is selected corresponding to the sum of expectation values (hereinafter, "throughput expectation values") of throughput calculated based on a value (hereinafter, referred to as a "CQI value") of a CQI (Channel Quality Indicator) of each stream transmitted from a base station apparatus eNode B to a single or a plurality of mobile station apparatuses UEs. More specifically, selected is the PMI associated with a precoding matrix that maximizes the sum of throughput expectation values calculated from the CQI value of each stream.

In the case where a single stream is used for the mobile station apparatus UE (i.e. the case of Rank 1), the throughput expectation value is calculated based on the CQI value measured from only the stream, the PMI that maximizes the throughput expectation value is selected, and therefore, the channel state in the channel transmission path is suitably reflected in the selected PMI. Meanwhile, in the case where the number of streams for the mobile station apparatus UE is two or more (i.e. the case of Rank 2 or more), the sum of throughput expectation values is calculated based on CQI values measured from a plurality of streams, and selected is the PMI that maximizes the sum of throughput expectation values. Therefore, even in the case of including matrix elements corresponding to the stream that approximates the channel state in the channel transmission path, when the sum of throughput expectation values is low, the PMI corresponding to the precoding matrix is not selected, and another PMI, which represents the channel state less appropriately than the PMI, can be selected.

Meanwhile, in the LTE-scheme system, SU-MIMO transmission and MU-MIMO transmission using user specific demodulation reference signals (UE specific RS) is specified in the same DCI (Downlink Control Information) format (DCI format 2B). Then, by using such a DCI format, it is possible to switch between SU-MIMO transmission and MU-MIMO transmission dynamically on a subframe-by-subframe basis. Further, it is conceivable that such a mechanism for enabling dynamic switching between MIMO transmission forms is used also in the LTE-A-scheme system. In such an environment in which it is possible to dynamically switch between MIMO transmission forms, it is necessary to transmit a PMI, which enables the obtained data rate (spectral efficiency) of the entire system to be increased while switching between SU-MIMO transmission and MU-MIMO transmission, to a base station apparatus eNode B as feedback.

The present invention was made in view of such circumstances, and it is an object of the invention to provide a precoding weight generation method, mobile station apparatus and base station apparatus for enabling a data rate (spectral efficiency) of the entire system to be increased also in the case of dynamically switching between SU-MIMO transmission and MU-MIMO transmission.

Solution to the Problems

A precoding weight generation method of the invention is characterized by having the steps in a mobile station apparatus of selecting a PMI associated with a precoding matrix including matrix elements corresponding to a stream that most approximates a channel matrix indicative of a channel state in a channel transmission path, and transmitting the selected PMI to a base station apparatus as channel information, and the steps in the base station apparatus of extracting the matrix elements corresponding to the stream that most approximates the channel state in the channel transmission path from the precoding matrix associated with the PMI transmitted from the mobile station apparatus, and generating precoding weights based on the extracted matrix elements.

According to this method, the mobile station apparatus transmits the PMI associated with the precoding matrix including the matrix elements that most approximate the channel state in the channel transmission path to the base station apparatus as feedback, the base station apparatus extracts the matrix elements that most approximate the channel state in the channel transmission path from the precoding matrix associated with the PMI that is fed back so as to use in generation of precoding weights, the mobile station apparatus is thus capable of transmitting the channel information that suitably indicates the channel state in the channel transmission path to the base station apparatus as feedback, the base station apparatus is capable of performing precoding based on the channel information that is fed back, and is thereby capable of performing precoding while reflecting the channel state in the channel transmission path irrespective of the number of streams (Rank number) for the mobile station apparatus i.e. in the case where the number of streams per mobile station apparatus is two or more, and it is possible to increase the data rate (spectral efficiency) of the entire system also in the case of dynamically switching between SU-MIMO transmission and MU-MIMO transmission.

A mobile station apparatus of the invention is characterized by having selection section configured to select a PMI associated with a precoding matrix including matrix elements corresponding to a stream that most approximates a channel matrix indicative of a channel state in a channel transmission path, and transmission section configured to transmit the PMI selected in the selection means to a base station apparatus as channel information.

According to this configuration, the mobile station apparatus transmits the PMI associated with the precoding matrix including the matrix elements that most approximate the channel state in the channel transmission path to the base station apparatus as feedback, and is thus capable of performing feedback of the PMI including the channel information that most suitably indicates the channel state in the channel transmission path.

A base station apparatus of the invention is characterized by having extraction section configured to extract matrix elements corresponding to a stream that most approximates a channel matrix indicative of a channel state in a channel transmission path from a precoding matrix associated with a PMI received from a mobile station apparatus, and generation section configured to generate precoding weights based on the matrix elements extracted in the extraction section.

According to this configuration, the base station apparatus generates precoding weights based on the matrix elements corresponding to the stream that most approximates the channel matrix indicative of the channel state in the channel transmission path, is capable of generating precoding weights based on the channel information that most suitably indicates the channel state in the channel transmission path, and is thereby capable of performing precoding while reflecting the channel state in the channel transmission path irrespective of the number of streams (Rank number) for the mobile station apparatus, and it is possible to increase the data rate (spectral efficiency) of the entire system also in the case of dynamically switching between SU-MIMO transmission and MU-MIMO transmission.

Technical Advantages of the Invention

According to the invention, the mobile station apparatus transmits the PMI associated with the precoding matrix including matrix elements corresponding to the stream that most approximates the channel state in the channel transmission path to the base station apparatus as feedback, the base station apparatus extracts the matrix elements corresponding to the stream that most approximates the channel state in the channel transmission path from the precoding matrix associated with the PMI that is fed back so as to use in generation of precoding weights, the mobile station apparatus is thus capable of transmitting the channel information that suitably indicates the channel state in the channel transmission path to the base station apparatus as feedback, the base station apparatus is capable of performing precoding based on the channel information, and is thereby capable of performing precoding while reflecting the channel state in the channel transmission path irrespective of the number of streams (Rank number) for the mobile station apparatus, and it is possible to increase the data rate (spectral efficiency) of the entire system also in the case of dynamically switching between SU-MIMO transmission and MU-MIMO transmission.

BRIEF DESCRIPTION OF DRAWINGS

FIG. 2 is a diagram to explain a PMI selection method in a mobile station apparatus in the MIMO system in the LTE scheme;

FIG. 3 is a diagram to explain a PMI selection method in a first aspect of a mobile station apparatus according to the invention;

FIG. 7 contains diagrams to explain a channel information extraction method in the base station apparatus according to the Embodiment.

DESCRIPTION OF EMBODIMENTS

Figure 1:
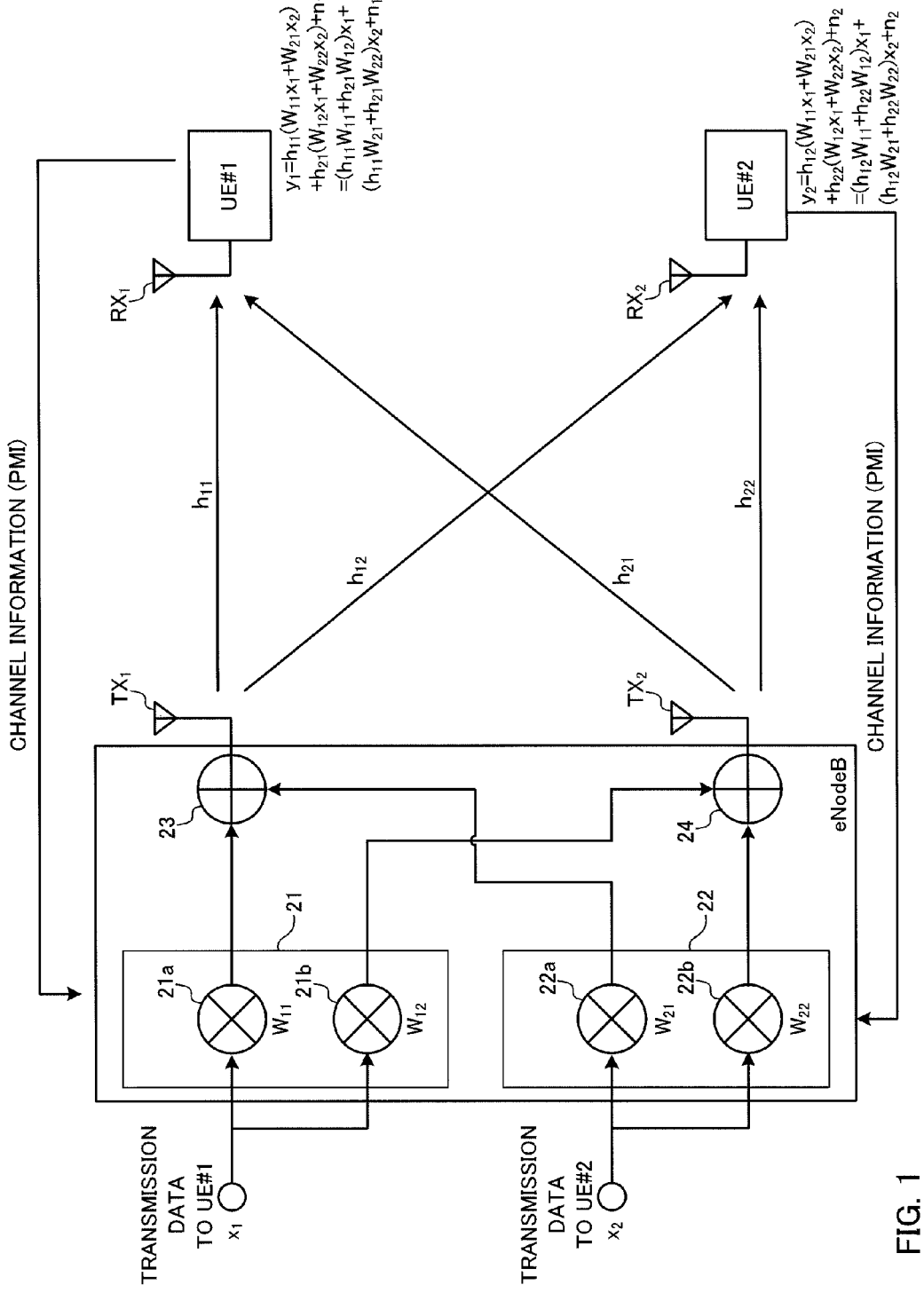
FIG. 1 is a conceptual diagram of a MIMO system in an LTE scheme.

Described first is precoding in downlink MIMO transmission performed in a MIMO system in an LTE scheme, based on a MIMO system as shown in FIG. 1 as the premise. FIG. 1 is a conceptual diagram of the MIMO system in the LTE scheme. In addition, in the MIMO system as shown in FIG. 1, shown is the case where Multiple User MIMO (MU-MIMO) is performed in between a base station apparatus eNode B and two mobile station apparatus UE#1 and UE#2. Further, in the MIMO system as shown in FIG. 1, shown is the case where the base station apparatus eNode B is provided with two transmission antennas, and each of the mobile station apparatuses UE#1 and UE#2 is provided with a single reception antenna.

In precoding in downlink MIMO transmission of the MIMO system as shown in FIG. 1, each of the mobile station apparatuses UE#1 and UE#2 measures a channel variation amount using a reception signal from a reception antenna $RX_1$ or $RX_2$, and based on the measured channel variation amount, selects a PMI corresponding to the phase/amplitude control amounts (precoding weights (precoding matrix)) that maximize a reception SINR of transmission data respectively from the transmission antennas $TX_1$ and $TX_2$ of the base station apparatus eNode B. Then, the mobile station apparatus transmits the selected PMI as the channel information to the base station apparatus eNode B as feedback in uplink. The base station apparatus eNode B performs precoding on transmission data $x_1$ to the mobile station apparatus UE#1 and transmission data $x_2$ to the mobile station apparatus UE#2 corresponding to the PMIs transmitted from the user apparatuses UEs as feedback, and then transmits the information from each of the transmission antennas $TX_1$ and $TX_2$.

The base station apparatus eNode B is provided with precoding processing sections 21 and 22 that perform precoding on the transmission data $x_1$ and $x_2$, respectively. The precoding processing section 21 has a weight multiplying section 21a that multiplies a precoding weight $W_{11}$ to transmit the transmission data $x_1$ from the transmission antenna $TX_1$, and a weight multiplying section 21b that multiplies a precoding weight $W_{12}$ to transmit the transmission data $x_1$ from the transmission antenna $TX_2$. Similarly, the precoding processing section 22 has a weight multiplying section 22a that multiplies a precoding weight $W_{21}$ to transmit the transmission data $x_2$ from the transmission antenna $TX_1$, and a weight multiplying section 22b that multiplies a precoding weight $W_{22}$ to transmit the transmission data $x_2$ from the transmission antenna $TX_2$.

The transmission data $x_1$ multiplied by the precoding weight $W_{11}$ and the transmission data $x_2$ multiplied by the precoding weight $W_{21}$ is added in an adder 23, and then, transmitted to a channel transmission path from the transmission antenna $TX_1$. Meanwhile, the transmission data $x_1$ multiplied by the precoding weight $W_{12}$ and the transmission data $x_2$ multiplied by the precoding weight $W_{22}$ is added in an adder 24, and then, transmitted to a channel transmission path from the transmission antenna $TX_2$.

The transmission data $x_1$ and $x_2$ transmitted from the transmission antennas $TX_1$ and $TX_2$ undergoes the effects of channel variations of the channel transmission paths formed in the reception antennas $RX_1$ and $RX_2$ of the mobile station apparatuses UE#1 and UE#2. In other words, the transmission data $x_1$ and $x_2$ transmitted from the transmission antenna $TX_1$ to the reception antenna $RX_1$ is multiplied by a channel state coefficient $h_{11}$, and the transmission data $x_1$ and $x_2$ transmitted from the transmission antenna $TX_1$ to the reception antenna $RX_2$ is multiplied by a channel state coefficient $h_{12}$. Similarly, the transmission data $x_1$ and $x_2$ transmitted from the transmission antenna $TX_2$ to the reception antenna $RX_1$ is multiplied by a channel state coefficient $h_{21}$, and the transmission data $x_1$ and $x_2$ transmitted from the transmission antenna $TX_2$ to the reception antenna $RX_2$ is multiplied by a channel state coefficient $h_{22}$.

The mobile station apparatuses UE#1 and UE#2 receive the transmission data $x_1$, $x_2$ as reception data $y_1$, $y_2$ via the reception antennas $RX_1$, $RX_2$. In this case, the reception data $y_1$, $y_2$ is respectively following values. Herein, $n_1$ and $n_2$ are noise components.

$$y_1 = h_{11}(W_{11}x_1 + W_{21}x_2) + h_{21}(W_{12}x_1 + W_{22}x_2) + n_1 = (h_{11}W_{11} + h_{21}W_{12})x_1 + (h_{11}W_{21} + h_{21}W_{22})x_2 + n_1$$

$$y_2 = h_{12}(W_{11}x_1 + W_{21}x_2) + h_{22}(W_{12}x_1 + W_{22}x_2) + n_2 = (h_{12}W_{11} + h_{22}W_{12})x_1 + (h_{12}W_{21} + h_{22}W_{22})x_2 + n_2$$

Based on the reception data $y_1$, $y_2$, each of the mobile station apparatuses UE#1 and UE#2 selects a PMI corresponding to a precoding weight that maximizes a reception SINR of the transmission data from each of the transmission antennas $TX_1$ and $TX_2$ of the base station apparatus eNode B. In this case, in the reception data $y_1$, $(h_{11}W_{11} + h_{21}W_{12})$ corresponds to signal power of the transmission data $x_1$ to the UE#1, and $(h_{11}W_{21} + h_{21}W_{22})$ corresponds to signal power of the transmission data $x_2$ to the other apparatus (mobile station apparatus UE#2). Therefore, the mobile station apparatus UE#1 selects a PMI corresponding to a precoding weight that increases the former power to a maximum, while decreasing the latter power to a minimum. Similarly, in the reception data $y_2$, $(h_{12}W_{21} + h_{22}W_{22})$ corresponds to signal power of the transmission data $x_2$ to the UE#2, and $(h_{12}W_{11} + h_{22}W_{12})$ corresponds to signal power of the transmission data $x_1$ to the other apparatus (mobile station apparatus UE#1). Therefore, the mobile station apparatus UE#2 selects a PMI corresponding to a precoding weight that increases the former power to a maximum, while decreasing the latter power to a minimum in the base station apparatus eNode B.

In this case, each of the mobile station apparatuses UE#1 and UE#2 calculates the sum of expectation values (throughput expectation values) of throughput based on CQI values measured respectively from two streams (i.e. stream 1 and stream 2 respectively transmitted from the transmission antennas $TX_1$ and $TX_2$ of the base station apparatus eNode B) and selects a PMI that maximizes the sum of throughput expectation values. Herein, the PMI selection method in the mobile station apparatus UE in the MIMO system as shown in FIG. 1 will be described using a specific example.

FIG. 2 is a diagram to explain the PMI selection method in the mobile station apparatus UE in the MIMO system in the LTE scheme. FIG. 2 illustrates the relationship between a precoding matrix in a codebook held in the mobile station apparatus UE and the throughput expectation value. In addition, herein, it is assumed that the base station apparatus eNode B and mobile station apparatus UE hold the codebook with only two precoding matrixes ($PM_1$, $PM_2$) as shown FIG. 2 registered therewith. It is further assumed that a channel matrix $H_k$ corresponding to the channel state in the channel transmission path is of a value described below.

$$H_k = \begin{bmatrix} 1 \\ 0.9 \end{bmatrix}$$

As shown in FIG. 2, in the precoding matrix $PM_1$, the throughput expectation value calculated based on the CQI value measured from the stream 1 is "10", the throughput expectation value calculated based on the CQI value measured from the stream 2 is "1", and the sum of the throughput expectation values is "11". Meanwhile, in the precoding matrix $PM_2$, the throughput expectation value calculated based on the CQI value measured from the stream 1 is "8", the throughput expectation value calculated based on the CQI value measured from the stream 2 is "7", and the sum of the throughput expectation values is "15". Therefore, the mobile station apparatus UE selects the PMI associated with the precoding matrix $PM_2$ that maximizes the sum of the throughput expectation values.

In FIG. 2, with attention given to the throughput expectation values on a stream-by-stream basis, the highest value is of the matrix elements associated with the stream 1 shown in the first column of the precoding matrix $PM_1$. This means that the channel state in the channel transmission path is indicated the most suitably in the stream 1 in the precoding matrix $PM_1$. However, in the conventional PMI selection method, selected is a PMI that maximizes the sum of throughput calculated based on CQI values of streams 1 and 2, and therefore, the PMI associated with the precoding matrix $PM_2$ is selected. The inventors of the invention noted the respect that a PMI is thus selected using the sum of throughput calculated based on CQI values of a plurality of streams, and that it is thereby not possible to select a PMI associated with the precoding matrix including matrix elements (hereinafter, referred to as "matrix elements" as appropriate) corresponding to a stream that most approximates the channel state in the channel transmission path, and arrived at the invention.

In a precoding weight generation method according to the invention, the mobile station apparatus UE selects a PMI associated with a precoding matrix including matrix elements that most approximate the channel state in the channel transmission path, and transmits the PMI to the base station apparatus eNode B as feedback, and the base station apparatus eNode B extracts the matrix elements that approximate the channel state in the channel transmission path from the precoding matrix associated with the PMI transmitted from the mobile station apparatus UE as feedback, and uses the PMI in generation of precoding weights. By this means, the mobile station apparatus is capable of transmitting the channel information that suitably indicates the channel state in the channel transmission path to the base station apparatus eNode B as feedback, the base station apparatus eNode B is capable of performing precoding based on the channel information that is fed back, and is thereby capable of performing precoding while reflecting the channel state in the channel transmission path irrespective of the number of streams (Rank number) for the mobile station apparatus, and it is possible to increase the data rate (spectral efficiency) of the entire system also in the case of dynamically switching between SU-MIMO transmission and MU-MIMO transmission.

In a first aspect, the mobile station apparatus UE applied to the precoding weight generation method according to the invention selects a PMI associated with a precoding matrix including matrix elements that minimize the chordal distance from the channel matrix $H_k$ corresponding to the channel state in the channel transmission path. Herein, a PMI selection method in the first aspect of the mobile station apparatus UE according to the invention will be described using the specific example as shown in FIG. 2.

FIG. 3 is a diagram to explain the PMI selection method in the first aspect of the mobile station apparatus UE according to the invention. FIG. 3 illustrates the relationship between the precoding matrix held in the mobile station apparatus UE, and the throughput expectation values and chordal distances. In addition, it is assumed in FIG. 3 that the content of the codebook held in the base station apparatus eNode B and mobile station apparatus UE and the channel matrix $H_k$ corresponding to the channel state in the channel transmission path are the same as in FIG. 2. Therefore, the throughput expectation values and sums of respective matrixes are the same values as the values shown in FIG. 2.

As shown in FIG. 3, in the matrix elements (1,1) associated with the stream 1 indicated in the first column of the $PM_1$, the chordal distance from the channel matrix $H_k$ is "0.01" that is the minimum value. In the matrix elements (1,−1) associated with the stream 2 indicated in the second column, the chordal distance from the channel matrix $H_k$ is "3.61" that is the maximum value. Meanwhile, in the matrix elements (1,j) associated with the stream 1 indicated in the first column of the $PM_2$, and in the matrix elements (1,−j) associated with the stream 2 indicated in the second column of the $PM_2$, the chordal distance from the channel matrix $H_k$ is "1.81" in both cases.

In this case, the mobile station apparatus UE selects a PMI associated with the precoding matrix $PM_1$ including the matrix elements that minimize the chordal distance from the channel matrix $H_k$. By this means, it is possible to select the PMI associated with the precoding matrix including the matrix elements that most approximate the channel matrix $H_k$ with accuracy. Then, the mobile station apparatus UE transmits thus selected PMI to the base station apparatus eNode B as feedback, and is thereby capable of performing feedback of the PMI including the channel information that most suitably indicates the channel state in the channel transmission path.

Further, in a second aspect, the mobile station apparatus UE according to the invention selects a PMI associated with a precoding matrix including matrix elements that maximize the Signal-to-Interference-plus-Noise Ratio (SINR). Herein, a PMI selection method in the second aspect of the mobile station apparatus UE according to the invention will be described using the specific example as shown in FIG. 2.

Generally, the SINR is proportional to a CQI value measured from each stream. Accordingly, the SINR in each stream has the same level relationship as the throughput expectation value proportional to the CQI value measured from each stream. In other words, in the matrix elements (1,1) associated with the stream 1 indicated in the first column of the $PM_1$, the SINR is the maximum. In the matrix elements (1,−1) associated with the stream 2 indicated in the second column, the SINR is the minimum. Meanwhile, in the matrix elements (1,j) associated with the stream 1 indicated in the first column of the $PM_2$, and in the matrix elements (1,−j) associated with the stream 2 indicated in the second column of the $PM_2$, relatively high SINRs are obtained, but the SINRs do not reach the SINR corresponding to the matrix elements (1,1) associated with the stream 1 indicated in the first column of the $PM_1$.

In this case, the mobile station apparatus UE selects the PMI associated with the precoding matrix $PM_1$ including the matrix elements that maximize the SINR. By this means, without requiring complicated arithmetic processing, it is possible to select the PMI associated with the precoding matrix including matrix elements that most approximate the channel matrix $H_k$. Then, the mobile station apparatus UE transmits thus selected PMI to the base station apparatus eNode B as feedback, and is thereby capable of performing feedback of the PMI including the channel information that most suitably indicates the channel state in the channel transmission path.

Meanwhile, in the base station apparatus eNode B applied to the precoding weight generation method according to the invention, the apparatus eNode B extracts matrix elements that most approximate the channel state in the channel transmission path from the precoding matrix associated with the PMI that is transmitted from the mobile station apparatus UE as feedback. At this point, the base station apparatus eNode B extracts the matrix elements based on CQI values for each stream that are transmitted from the mobile station apparatus UE also as feedback. More specifically, the apparatus eNode B extracts the matrix elements associated with the stream with the maximum CQI value that is transmitted from the mobile station apparatus UE as feedback. Then, the apparatus eNode B generates precoding weights based on the extracted matrix elements. By this means, the apparatus eNode B is capable of generating precoding weights based on the matrix elements that most suitably indicate the channel state in the channel transmission path, and is thereby capable of performing precoding while reflecting the channel state in the channel transmission path irrespective of the number of streams (Rank number) for the mobile station apparatus UE, and it is possible to increase the data rate (spectral efficiency) of the entire system also in the case of dynamically switching between SU-MIMO transmission and MU-MIMO transmission.

The case will be considered where the PMI associated with $PM_1$ shown in FIG. 3 is selected by the above-mentioned PMI selection method in the mobile station apparatus UE and is transmitted as feedback. In this case, the CQI values transmitted from the mobile station apparatus UE have the same level relationship as the throughput expectation values in respective streams as described above. In other words, the CQI value measured from the stream 1 is larger than the CQI value measured from the stream 2. Therefore, the base station apparatus eNode B extracts the matrix elements (i.e. matrix elements of the first column) associated with the stream 1 from the $PM_1$ associated with the PMI that is transmitted from the mobile station apparatus UE as feedback. Then, the apparatus eNode B generates precoding weights based on the matrix elements (1,1) associated with the stream 1.

An Embodiment of the invention will specifically be described below with reference to accompanying drawings. Described herein is the case of using the base station apparatus and mobile station apparatus that support the LTE-A system.

Figure 4:
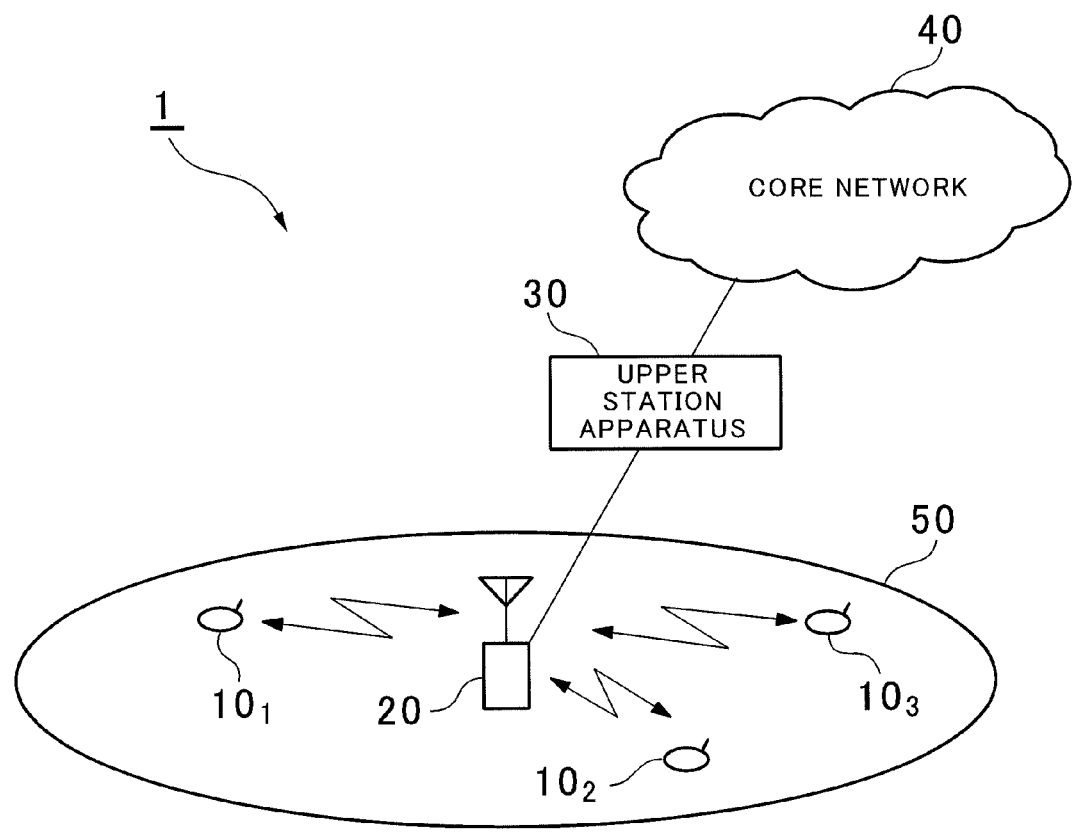
FIG. 4 is a diagram to explain a configuration of a mobile communication system according to an Embodiment of the invention.

Referring to FIG. 4, described is a mobile communication system 1 having mobile station apparatuses (UEs) 10 and base station apparatus (eNode B) 20 according to one Embodiment of the invention. FIG. 4 is a diagram to explain a configuration of the mobile communication system 1 having mobile station apparatuses 10 and base station apparatus 20 according to the Embodiment of the invention. In addition, for example, the mobile communication system 1 as shown in FIG. 4 is a system including the LTE system or Super 3G. Further, the mobile communication system 1 may be called IMT-Advanced or may be called 4G.

As shown in FIG. 4, the mobile communication system 1 includes a base station apparatus 20 and a plurality of mobile station apparatuses 10 ($10_1$, $10_2$, $10_3$, . . . $10_n$, n is an integer where n>0) that communicate with the base station apparatus 20, and is comprised thereof. The base station apparatus 20 is connected to an upper station apparatus 30, and the upper station apparatus 30 is connected to a core network 40. The mobile station apparatuses 10 communicate with the base station apparatus 2 in a cell 50. In addition, for example, the upper station apparatus 30 includes an access gateway apparatus, Radio Network Controller (RNC), Mobility Management Entity (MME) and the like, but is not limited thereto.

Each of the mobile station apparatuses ($10_1$, $10_2$, $10_3$, . . . $10_n$) has the same configuration, function and state, and is described as a mobile station apparatus 10 unless otherwise specified in the following description. Further, for convenience in description, the description is given while assuming that equipment which performs radio communication with the base station apparatus 20 is the mobile station apparatus 10, and more generally, the equipment may be user equipment (UE) including mobile terminal apparatuses and fixed terminal apparatuses.

In the mobile communication system 1, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system. In downlink, used are the PDSCH shared among the mobile station apparatuses 10, and downlink L1/L2 control channel (PDCCH, PCFICH, PHICH). User data i.e. normal data signals are transmitted on the PDSCH. The transmission data is included in the user data. In addition, a CC assigned to a mobile station apparatus 10 in the base station apparatus 20 and scheduling information is notified to the mobile station apparatus 10 on the L1/L2 control channel.

In uplink, used are the PUSCH (Physical Uplink Shared Channel) shared among the mobile station apparatuses 10, and the PUCCH (Physical Uplink Control Channel) that is a control channel in uplink. User data is transmitted on the PUSCH. Meanwhile, radio quality information (CQI: Channel Quality Indicator) in downlink and the like are transmitted on the PUCCH.

Figure 5:
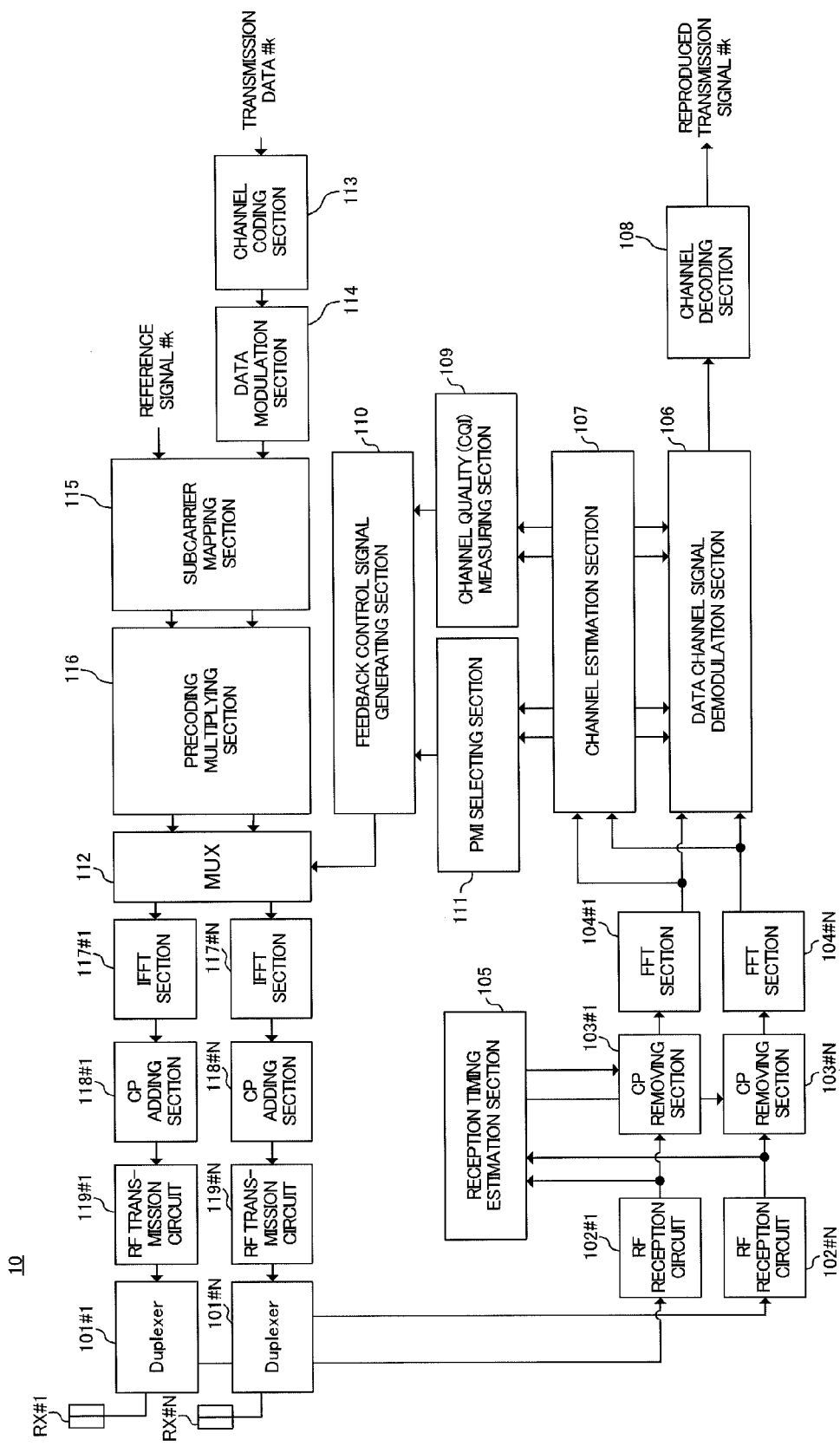
FIG. 5 is a block diagram illustrating a configuration of a mobile station apparatus according to the Embodiment.
Figure 6:
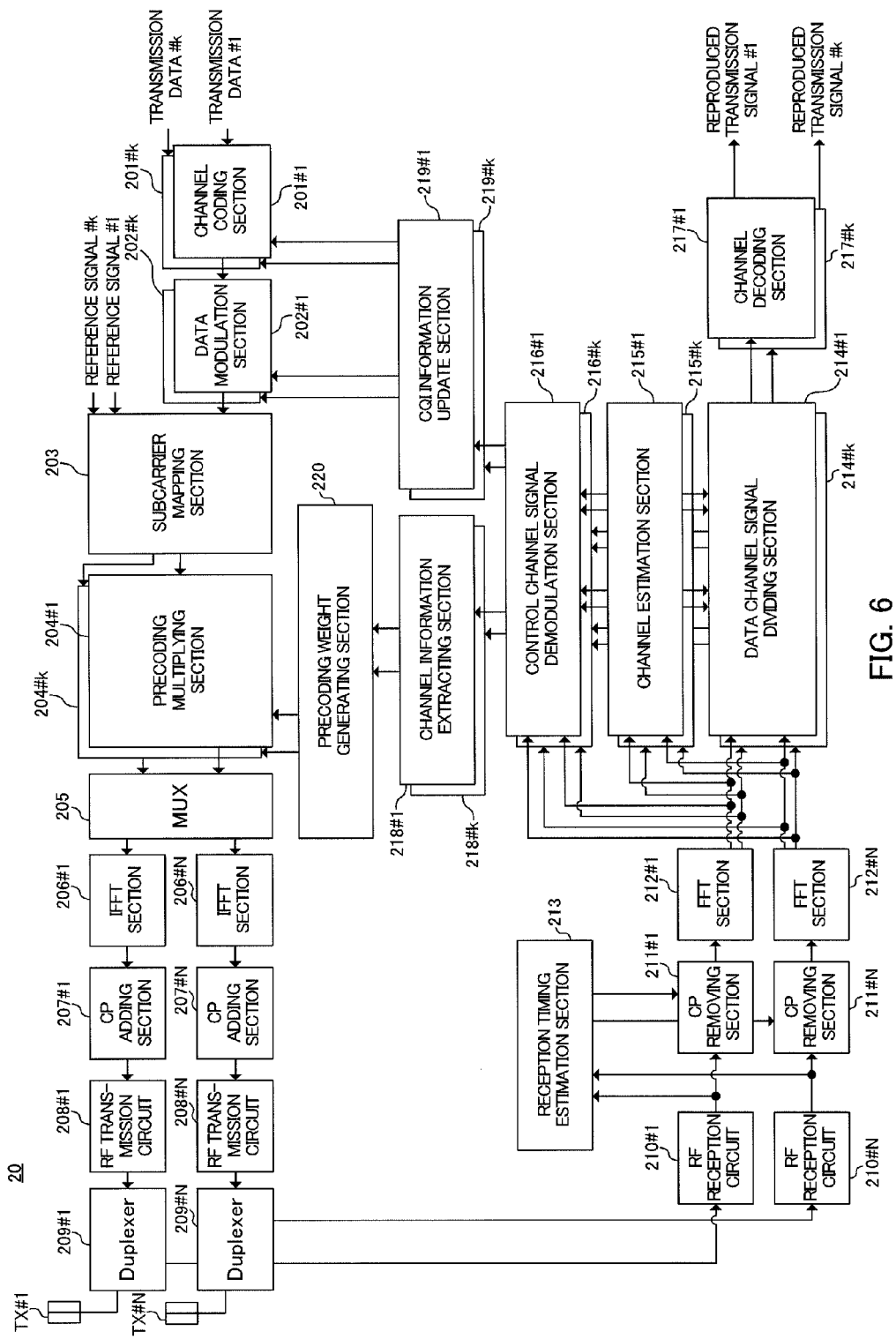
FIG. 6 is a block diagram illustrating a configuration of a base station apparatus according to the Embodiment.

FIG. 5 is a block diagram illustrating a configuration of the mobile station apparatus 10 according to this Embodiment. FIG. 6 is a block diagram illustrating a configuration of the base station apparatus 20 according to this Embodiment. In addition, the configurations of the mobile station apparatus 10 and the base station apparatus 20 as shown in FIGS. 5 and 6 are simplified to explain the invention, and are assumed to have the configurations that a normal mobile station apparatus and base station apparatus have, respectively.

In the mobile station apparatus 10 as shown in FIG. 5, transmission signals transmitted from the base station apparatus 20 are received in reception antennas RX#1 to RX#N, electrically divided into transmission paths and reception paths in duplexers 101#1 to 101#N, and then, output to RF reception circuits 102#1 to 102#N. Then, the signals undergo frequency conversion processing for converting a radio-frequency signal into a baseband signal in the RF reception circuits 102#1 to 102#N. CPs are removed from the baseband signals subjected to the frequency conversion processing in cyclic prefix (CP) removing sections 103#1 to 103#N, and the resultants are output to Fast Fourier Transform sections (FFT sections) 104#1 to 104#N. A reception timing estimation section 105 estimates reception timing from reference signals included in the reception signals, and notifies the CP removing sections 103#1 to 103#N of the estimation result. The FFT sections 104#1 to 104#N perform Fourier transform on the input reception signals, and transform the time-series signals into the signals in the frequency domain. The reception signals transformed into the signals in the frequency domain are output to a data channel signal demodulation section 106.

The data channel signal demodulation section 106 divides the reception signals input from the FFT sections 104#1 to 104#N, for example, by Minimum Mean Square Error (MMSE) or Maximum Likelihood Detection (MLD) signal division method. By this means, the reception signals coming from the base station apparatus 20 are divided into reception signals concerning users #1 to #k, and a reception signal concerning a user (herein, assumed to be a user k) of the mobile station apparatus 10 is extracted. A channel estimation section 107 estimates channel states from reference signals included in the reception signals output from the FFT sections 104#1 to 104#N, and notifies the estimated channel states to the data channel signal demodulation section 106, and a channel quality measuring section 109 and PMI selecting section 111, described later. The data channel signal demodulation section 106 divides the reception signals by the above-mentioned MLD signal division method based on the notified channel states. By this means, the reception signal concerning the user k is demodulated.

In addition, it is assumed that the extracted reception signal concerning the user k is demapped in a subcarrier demapping section, not shown, prior to the demodulation processing in the data channel signal demodulation section 106. The reception signal concerning the user k demodulated in the data channel signal demodulation section 106 is output to a channel decoding section 108. Then, the channel decoding section 108 performs channel decoding processing, and a transmission signal #k is thus reproduced.

The channel quality measuring section 109 measures channel quality (CQI) based on the channel states notified from the channel estimation section 107. Then, the section 109 notifies a feedback control signal generating section 110 of a CQI that is the measurement result. The PMI selecting section 111 constitutes the selection section, and based on the channel states notified from the channel estimation section 107, selects the PMI associated with a precoding matrix including matrix elements that most approximate the channel state in the channel transmission path by the above-mentioned first or second aspect. Then, the section 111 notifies the feedback control signal generating section 110 of the selected PMI.

For example, the PMI selecting section 111 selects the PMI associated with the precoding matrix including matrix elements corresponding to a stream that minimizes the chordal distance from the channel matrix corresponding to the channel state in the channel transmission path (first aspect). Meanwhile, the section 111 selects the PMI associated with the precoding matrix including matrix elements corresponding to a stream that maximizes the reception SINR (second aspect). In addition, it is possible to switch between the first and second aspects by instructions from the base station apparatus 20 to select the PMI. Thus selected PMI is input to the feedback control signal generating section 110.

The feedback control signal generating section 110 constitutes part of the transmission section, and based on the notified CQI and PMI, generates a control signal (for example, PUCCH) to transmit to the base station apparatus 20 as feedback. The control signal generated in the feedback control signal generating section 110 is output to a multiplexer (MUX) 112.

Transmission data #k concerning the user #k output from a higher layer is subjected to channel coding in a channel coding section 113, and is subjected to data modulation in a data modulation section 114. The transmission data 44k subjected to data modulation in the data modulation section 114 is transformed from the time-series signal into the signal in the frequency domain in a serial/parallel transform section, not shown, and is output to a subcarrier mapping section 115.

The subcarrier mapping section 115 maps the transmission data #k to subcarriers corresponding to scheduling information indicated from the base station apparatus 20. At this point, the subcarrier mapping section 115 maps (multiplexes) a reference signal #k generated in a reference signal generating section, not shown, to the subcarriers together with the transmission data #k. The transmission data #k thus mapped to the subcarriers is output to a precoding multiplying section 116.

The precoding multiplying section 116 shifts the phase and/or amplitude of the transmission data #k for each of the reception antennas RX#1 to RX#N based on the precoding weights obtained from the PMI selected in the PMI selecting section 111. The transmission data #k with the phase and/or amplitude shifted in the precoding multiplying section 116 is output to the multiplexer (MUX) 112.

The multiplexer (MUX) 112 combines the transmission data #k with the phase and/or amplitude shifted and the control signal generated in the feedback control signal generating section 110, and generates transmission signals for each of the reception antennas RX#1 to RX#N. The transmission signals generated in the multiplexer (MUX) 112 are subjected to inverse fast Fourier transform in inverse fast Fourier transform sections 117, transformed from the signals in the frequency domain into the signals in the time domain, then provided with CPs in CP adding sections 118#1 to 118#N, and output to RF transmission circuits 119#1 to 119#N. Then, the RF transmission circuits 119#1 to 119#N perform frequency conversion processing for converting into the radio frequency band on the signals to output to the reception antennas RX#1 to RX#N via the duplexers 101#1 to 101#N, and the signals are transmitted from the reception antennas RX#1 to RX#N to the base station apparatus 20 in uplink.

Thus, the mobile statin apparatus 10 according to this Embodiment selects the PMI by the above-mentioned first or second aspect based on the channel states notified from the channel estimation section 107, transmits the selected PMI to the base station apparatus 20 as feedback, is thereby capable of performing feedback of the PMI associated with the precoding matrix including matrix elements that most approximate the channel state in the channel transmission path, and as a result, is capable of performing feedback of the PMI including the channel information that most suitably indicates the channel state in the channel transmission path.

In the base station apparatus 20 as shown in FIG. 6, a scheduler, not shown, determines the number of users (the number of multiplexed users) to multiplex based on channel estimation values provided from channel estimation sections 215#1 to 215#k, described later. Then, the scheduler determines the resource allocation content (scheduling information) of uplink and downlink to each user, and outputs transmission data #1 to #k to users #1 to #k to corresponding channel coding sections 201#1 to 201#k.

The transmission data #1 to #k is subjected to channel coding in the channel coding sections 201#1 to 201#k, then output to data modulation sections 202#1 to 202#k, and is subjected to data modulation. At this point, channel coding and data modulation is performed based on the channel coding rate and modulation scheme provided from CQI information update sections 219#1 to 219#k, described later. The transmission data #1 to #k subjected to data modulation in the data modulation sections 202#1 to 202#k is output to a subcarrier mapping section 203.

The subcarrier mapping section 203 maps the transmission data #1 to #k to subcarriers corresponding to scheduling information provided from the scheduler. At this point, the subcarrier mapping section 203 maps (multiplexes) reference signals #1 to #k input from a reference signal generating section, not shown, to the subcarriers together with the transmission data #1 to #k. The transmission data #1 to #k thus mapped to the subcarriers is output to precoding multiplying sections 204#1 to 204#k.

The precoding multiplying sections 204#1 to 204#k shift the phases and/or amplitude of the transmission data #1 to #k for each of transmission antennas TX#1 to TX#N based on the precoding weights provided from a precoding weight generating section 220, described later, (weighting of the transmission antennas TX#1 to TX#N by precoding). The transmission data #1 to #k with the phases and/or amplitude shifted in the precoding multiplying sections 204#1 to 204#k is output to the multiplexer (MUX) 205.

The multiplexer (MUX) 205 combines the transmission data #1 to #k with the phases and/or amplitude shifted, and generates transmission signals for each of the transmission antennas TX#1 to TX#N. The transmission signals generated in the multiplexer (MUX) 205 are subjected to inverse fast Fourier transform in inverse fast Fourier transform sections 206#1 to 206#N, transformed from the signals in the frequency domain into the signals in the time domain. Then, the signals are provided with CPs in cyclic prefix (CP) adding sections 207#1 to 207#N, and output to RF transmission circuits 208#1 to 208#N. Then, the RF transmission circuits 208#1 to 208#N perform frequency conversion processing for converting into the radio frequency band on the signals to output to the transmission antennas TX#1 to TX#N via the duplexers 209#1 to 209#N, and the signals are transmitted from the transmission antennas TX#1 to TX#N to the mobile station apparatuses 10 in downlink.

Meanwhile, transmission signals transmitted from the mobile station apparatuses 10 in uplink are received in the transmission antennas TX#1 to TX#N, electrically divided into transmission paths and reception paths in the duplexers 209#1 to 209#N, and then, output to RF reception circuits 210#1 to 210#N. Then, the signals undergo frequency conversion processing for converting a radio-frequency signal into a baseband signal in the RF reception circuits 210#1 to 210#N. CPs are removed from the baseband signals subjected to the frequency conversion processing in CP removing sections 211#1 to 211#N, and the resultants are output to Fast Fourier Transform sections (FFT sections) 212#1 to 212#N. A reception timing estimation section 213 estimates reception timing from reference signals included in the reception signals, and notifies the CP removing sections 211#1 to 211#N of the estimation result. The FFT sections 212#1 to 212#N perform Fourier transform on the input reception signals, and transform the time-series signals into the signals in the frequency domain. The reception signals transformed into the signals in the frequency domain are output to data channel signal dividing sections 214#1 to 214#k.

The data channel signal dividing sections 214#1 to 214#k divide the reception signals input from the FFT sections 212#1 to 212#k, for example, by Minimum Mean Square Error (MMSE) or Maximum Likelihood Detection (MLD) signal division method. By this means, the reception signals coming from the mobile station apparatuses 10 are divided into reception signals concerning users #1 to #k. The channel estimation sections 215#1 to 215#k estimate channel states from reference signals included in the reception signals output from the FFT sections 212#1 to 212#k, and notify the estimated channel states to the data channel signal dividing sections 214#1 to 214#k, and control channel signal demodulation sections 216#1 to 216#k. The data channel signal dividing sections 214#1 to 214#k divide the reception signals by the above-mentioned MMSE or MLD signal division method based on the notified channel states.

The reception signals concerning the users #1 to #k divided in the data channel signal dividing sections 214#1 to 214#k are demapped in subcarrier demapping sections, not shown, restored to the time-series signals, and then, are subjected to data demodulation in data demodulation sections, not shown. Then, channel decoding sections 217#1 to 217#k perform channel decoding processing, and transmission signals #1 to #k are thus reproduced.

The control channel signal demodulation sections 216#1 to 216#k demodulate control channel signals (for example, PUCCH) included in the reception signals input from the FFT sections 212#1 to 212#k. At this point, the control channel signal demodulation sections 216#1 to 216#k demodulate control channel signals respectively associated with the users #1 to #k. At this point, the control channel signal demodulation sections 216#1 to 216#k demodulate the control channel signals based on the channel states notified from the channel estimation sections 215#1 to 215#k. The control channel signals demodulated in the control channel signal demodulation sections 216#1 to 216#k are output to channel information extracting sections 218#1 to 218#k and CQI information update sections 219#1 to 219#k, respectively.

The channel information extracting sections 218#1 to 218#k constitute the extraction section, and extract channel information that most approximates the channel states in the channel transmission paths from information included in respective control channel signals (for example, PUCCH) input from the control channel signal demodulation sections 216#1 to 216#k. More specifically, the sections 218#1 to 218#k extract matrix elements that most approximate the channel states in the channel transmission paths included in the precoding matrixes associated with PMIs as the channel information, based on the information (the PMIs and CQI values) included in the control channel signals (for example, PUCCH). The channel information (matrix elements associated with the stream) extracted by the channel information extracting sections 218#1 to 218#k is output to a precoding weight generating section 220.

The precoding weight generating section 220 constitutes the generation section, and based on the channel information (matrix elements associated with the stream) input from the channel information extracting sections 218#1 to 218#k, generates precoding weights indicative of the phase and/or amplitude shift amounts for the transmission data #1 to #k. The generated precoding weights are output to the precoding multiplying sections 204#1 to 204#k, and used in precoding of the transmission data #1 to #k.

The CQI information update sections 219#1 to 219#k measure CQIs from the reference signals included in respective control channel signals (for example, PUCCH) input from the control channel signal demodulation sections 216#1 to 216#k, while always updating the CQI information to the latest state. The CQI information updated in the CQI information update sections 219#1 to 219#k is output to the channel coding sections 201#1 to 201#k and data modulation sections 202#1 to 202#k, respectively.

Thus, according to the base station apparatus 20 according to this Embodiment, the channel information extracting sections 218#1 to 218#k extract the matrix elements that most approximate the channel states in the channel transmission paths as the channel information, the precoding weight generating section 220 generates precoding weights indicative of the phase and/or amplitude shift amounts for the transmission data #1 to #k based on the channel information (matrix elements associated with the stream), the apparatus 20 is thereby capable of generating precoding weights based on the matrix elements that most suitably indicate the channel state in the channel transmission path, and is thus capable of performing precoding while reflecting the channel state in the channel transmission path irrespective of the number of streams (Rank number) for the mobile station apparatus UE, and it is possible to increase the data rate (spectral efficiency) of the entire system also in the case of dynamically switching between SU-MIMO transmission and MU-MIMO transmission.

As described above, in the precoding weight generation method according to this Embodiment, the mobile station apparatus 10 selects a PMI associated with a precoding matrix including matrix elements that most approximate a channel state in a channel transmission path, and transmits the PMI to the base station apparatus 20 as feedback, while the base station apparatus 20 extracts the matrix elements that most approximate the channel state in the channel transmission path from the precoding matrix associated with the PMI that is transmitted from the mobile station apparatus 10 as feedback, and uses the elements in generation of precoding weights. By this means, the mobile station apparatus 10 is capable of transmitting the channel information that suitably indicates the channel state in the channel transmission path to the base station apparatus 20 as feedback, the base station apparatus is capable of performing precoding based on the channel information that is fed back, and is thereby capable of performing precoding while reflecting the channel state in the channel transmission path irrespective of the number of streams (Rank number) for the mobile station apparatus UE, and it is possible to increase the data rate (spectral efficiency) of the entire system also in the case of dynamically switching between SU-MIMO transmission and MU-MIMO transmission.

In the above-mentioned descriptions, the invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

In the precoding weight generation method according to the above-mentioned Embodiment, shown is the case where the mobile station apparatus 10 selects a PMI associated with a precoding matrix including matrix elements that most approximate a channel state in a channel transmission path to transmit to the base station apparatus 20 as feedback, and the base station apparatus 20 extracts the matrix elements that most approximate the channel state in the channel transmission path as the channel information from the precoding matrix associated with the PMI that is fed back, and uses the elements in generation of precoding weights. However, the extraction method and usage method of the channel information in the base station apparatus 20 is not limited thereto, and are capable of being modified as appropriate. For example, it is possible to divide the matrix elements that most approximate the channel state in the channel transmission path to extract, and use apart of the extracted different matrix elements in generation of precoding weights concerning a different stream.

A specific example is shown in the case of thus modifying the extraction method of the channel information in the base station apparatus 20. Herein, the description is given on the case where the base station apparatus is provided with four transmission antennas and transmits the information to the mobile station apparatus 10 with two streams. FIG. 7 contains diagrams to explain the channel information extraction method in the base station apparatus 20 to which the precoding weight generation method according to the invention is applied. FIG. 7(a) shows a precoding matrix $PM_3$ associated with a PMI selected in the mobile station apparatus 10, and FIG. 7(b) shows parts of the matrix elements extracted from the precoding matrix $PM_3$ in the base station apparatus 20. In addition, in the precoding matrix $PM_3$, it is assumed that matrix elements a are matrix elements that most approximate the channel state in the channel transmission path.

When the PMI associated with the precoding matrix $PM_3$ is transmitted from the mobile station apparatus 10 as feedback, in the base station apparatus 20, the channel information extracting sections 218#1 to 218#k extract CQI values, a part (first and second rows) of the matrix elements a and the other part (third and fourth rows) based on a beforehand determined rule to output to the precoding weight generating section 220 as the channel information. Then, for example, the precoding weight generating section 220 uses the part (first and second rows) of the matrix elements a in generation of precoding weights for the stream 1, and uses the other part in generation of precoding weights for the other stream 2.

In this case, for example, also in the case of using an array antenna (cross polarization array antenna) with planes of polarization crossed, it is possible to perform precoding while reflecting the channel state in the channel transmission path in transmission data from different antennas, and also in the case of dynamically switching between SU-MIMO transmission and MU-MIMO transmission, it is possible to increase the data rate (spectral efficiency) of the entire system. In addition, the effect obtained in the case of thus modifying the channel information extraction method in the base station apparatus 20 is not limited to the case of using a cross-polarization array antenna.

Further, in the case of thus modifying the channel information extraction method in the base station apparatus 20, it is necessary to impose certain restrictions on PMIs selected in the mobile station apparatus 10. More specifically, it is necessary to select only PMIs associated with precoding matrixes with the same values defined in a part and the other part of the matrix elements that are extracted in the channel information extracting sections 218. For example, the restrictions on selected PMIs are actualized by codebook subset restriction notified from the base station apparatus 20 to the mobile station apparatus 10.

The present application is based on Japanese Patent Application No. 2010-010059 filed on Jan. 20, 2010, entire content of which is expressly incorporated by reference herein.

The invention claimed is:

1. A precoding weight generation method of generating precoding weights by which transmission data is multiplied, the transmission data being transmitted from a base station apparatus to a mobile station apparatus with a plurality of streams by using Multi Input Multi Output (MIMO) transmission, the method comprising:
  in the mobile station apparatus,
  calculating a throughput expectation value for each of the plurality of streams based on a channel state of each of the plurality of streams, performing the calculating for each of predetermined precoding matrices, and selecting a precoding matrix indicator (PMI) associated with a precoding matrix of the predetermined precoding matrices, the precoding matrix including matrix elements that maximize a throughput expectation value in the calculated throughput expectation values;
  transmitting the selected PMI to the base station apparatus as channel information;
  in the base station apparatus, extracting the matrix elements that maximize the throughput expectation value from the precoding matrix associated with the PMI transmitted from the mobile station apparatus as feedback; and
  generating precoding weights based on the extracted matrix elements.

2. A mobile station apparatus that receives data which is transmitted from a base station apparatus with a plurality of streams by using Multi Input Multi Output (MIMO) transmission, the mobile station apparatus comprising:
- a selection section configured to calculate a throughput expectation value for each of the plurality of streams based on a channel state of each of the plurality of streams, performing the calculating for each of predetermined precoding matrices, and select a precoding matrix indicator (PMI) associated with a precoding matrix of the predetermined precoding matrices, the precoding matrix including matrix elements that maximize a throughput expectation value in the calculated throughput expectation values; and
- a transmission section configured to transmit the PMI selected in the selection section to the base station apparatus as channel information.

3. The mobile station apparatus according to claim 2, wherein the matrix elements that maximize a throughput expectation value in the calculated throughput expectation values, correspond to matrix elements that minimize a chordal distance from a channel matrix indicative of a channel state in a channel transmission path.

4. The mobile station apparatus according to claim 2, wherein the matrix elements that maximize a throughput expectation value in the calculated throughput expectation values, correspond to matrix elements that maximize a Signal to Interference plus Noise Ratio (SINR) in the mobile station apparatus.

5. A base station apparatus that transmits data to a mobile station apparatus with a plurality of streams by using Multi Input Multi Output (MIMO) transmission, the base station apparatus comprising:
- an extraction section configured to extract matrix elements that maximize a throughput expectation value from a precoding matrix associated with a precoding matrix indicator (PMI) transmitted from a mobile station apparatus as feedback, based on a channel state of each of the plurality of streams; and
- a generation section configured to generate precoding weights based on the matrix elements extracted in the extraction section,
- wherein the mobile station apparatus calculates a throughput expectation value for each of the plurality of streams based on a channel state of each of the plurality of streams, and performs the calculation for each of predetermined precoding matrices so as to select the PMI.

6. The base station apparatus according to claim 5, wherein the extraction section extracts matrix elements corresponding to a stream with a highest value among channel quality indicators (CQIs) of respective streams transmitted from the mobile station apparatus.

7. The base station apparatus according to claim 5, wherein the extracted matrix elements that maximize a throughput expectation value in the calculated throughput expectation values, correspond to matrix elements that most approximate a channel matrix indicative of a channel state in a channel transmission path, and the generation section generates precoding weights for different streams based on different parts of the matrix elements extracted in the extraction section.

* * * * *